(12) United States Patent
Carson et al.

(10) Patent No.: US 8,988,208 B2
(45) Date of Patent: Mar. 24, 2015

(54) TIRE TEMPERATURE EMERGENCY WARNING HEAT INDICATOR/TRANSMITTER WITH COOLING SOLUTION

(71) Applicants: George J. Carson, Chicago, IL (US); Dion D. Xenos, Palos Hills, IL (US)

(72) Inventors: George J. Carson, Chicago, IL (US); Dion D. Xenos, Palos Hills, IL (US)

( * ) Notice: Subject to any disclaimer, the term of this patent is extended or adjusted under 35 U.S.C. 154(b) by 25 days.

(21) Appl. No.: 13/777,419

(22) Filed: Feb. 26, 2013

(65) Prior Publication Data

US 2013/0234847 A1    Sep. 12, 2013

Related U.S. Application Data

(60) Provisional application No. 61/609,729, filed on Mar. 12, 2012.

(51) Int. Cl.
*B60Q 1/00* (2006.01)
*B60C 23/20* (2006.01)
*B60C 23/18* (2006.01)

(52) U.S. Cl.
CPC ............. *B60C 23/20* (2013.01); *B60C 23/18* (2013.01)
USPC ........................................ 340/449; 340/447

(58) Field of Classification Search
USPC ................... 340/449, 442, 445, 447; 73/146
See application file for complete search history.

(56) References Cited

U.S. PATENT DOCUMENTS

| | | | | |
|---|---|---|---|---|
| 3,510,835 | A * | 5/1970 | Gilbert | 340/449 |
| 6,025,777 | A * | 2/2000 | Fuller et al. | 340/442 |
| 6,369,712 | B2 * | 4/2002 | Letkomiller et al. | 340/447 |
| 6,545,599 | B2 * | 4/2003 | Derbyshire et al. | 340/442 |
| 6,580,364 | B1 * | 6/2003 | Munch et al. | 340/447 |
| 6,938,467 | B2 * | 9/2005 | Tsujita | 73/146 |
| 6,963,273 | B2 * | 11/2005 | O'Brien et al. | 340/443 |
| 7,218,210 | B2 * | 5/2007 | Schoenberger et al. | 340/445 |
| 7,880,595 | B2 * | 2/2011 | Shimura | 340/431 |
| 8,649,181 | B2 * | 2/2014 | Yamaguchi | 340/442 |

* cited by examiner

*Primary Examiner* — John A Tweel, Jr.
(74) *Attorney, Agent, or Firm* — Bill C. Panagos; J. Scott Martin; Butzel Long, PC

(57) ABSTRACT

A system and method for operating a tire temperature warning system with an optional cooling solution is disclosed.

15 Claims, 4 Drawing Sheets

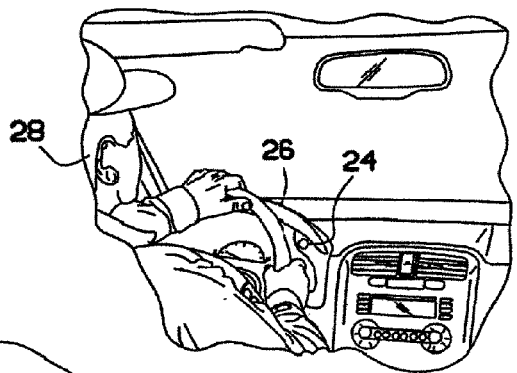
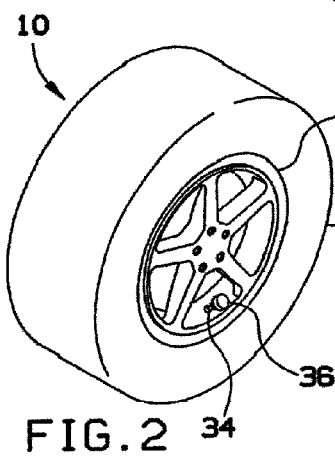
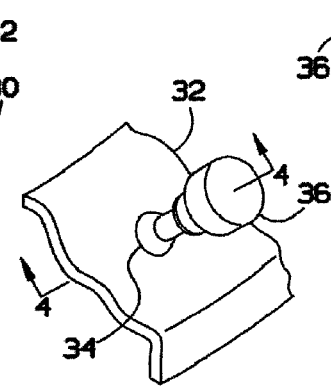
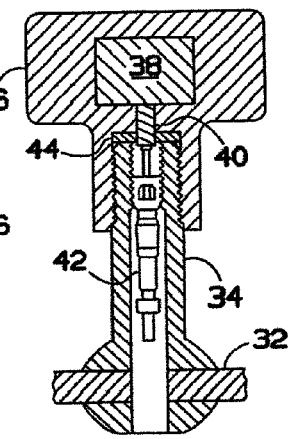
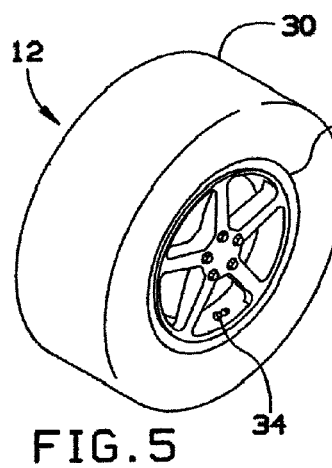
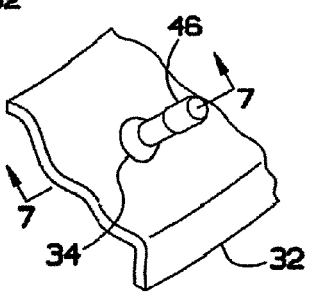
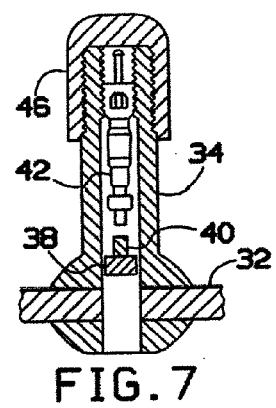

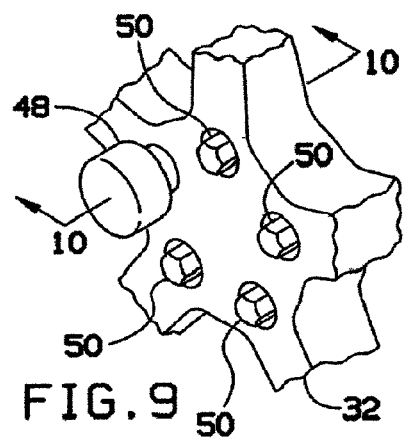
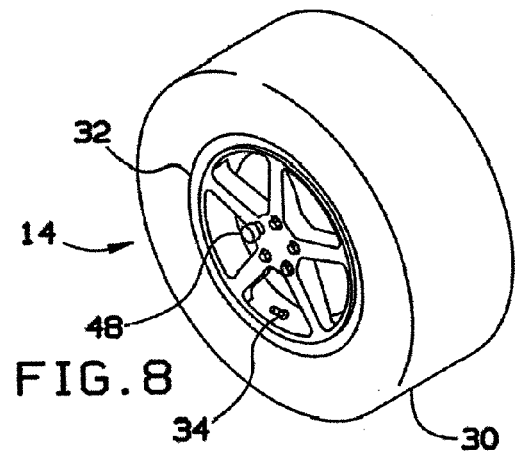
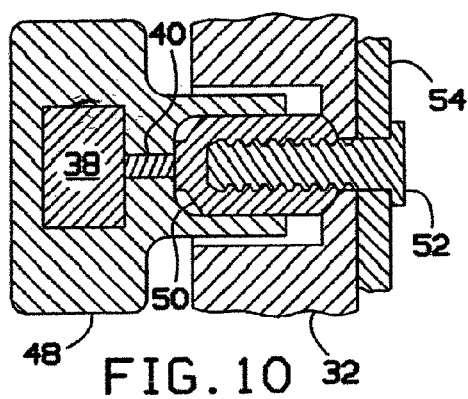
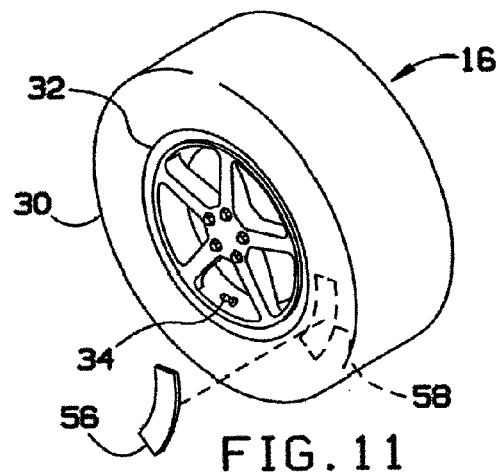
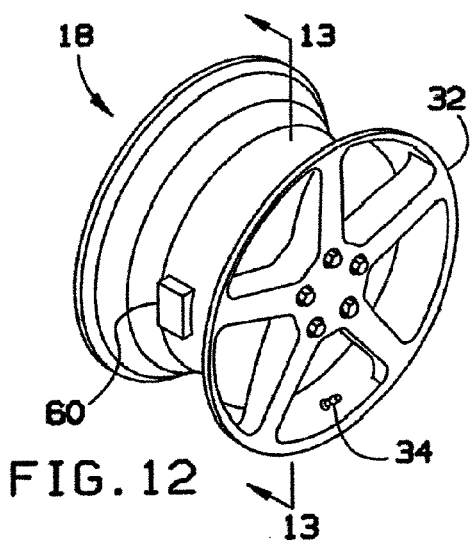
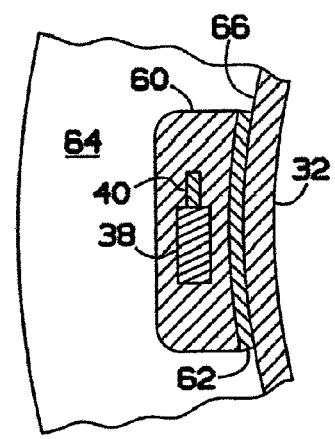

TIRE TEMPERATURE EMERGENCY WARNING HEAT INDICATOR/TRANSMITTER WITH COOLING SOLUTION

CLAIM OF PRIORITY

The present application claims priority from U.S. provisional patent application 61/609,729 filed Mar. 12, 2012, which is hereby incorporated herein in its entirety.

TECHNICAL FIELD

During wheeled vehicle travel, tire temperatures can rise to the point of tire failure. This may be especially understood when ambient temperatures are high, and the road is warmed to the extent that heat radiated from the road surface is transmitted to the vehicle tires. Generally, tires are able to accommodate wide extremes in temperature, however, when the temperature tolerance threshold is exceeded, such as, for example, extended operation when the tire pressure is low, or when the road temperature is high, tire failure can be experienced. Such tire failures are usually extreme and unexpected, and may pose a safety concern for a vehicle operator. There is a need for a tire temperature safety system that detects at least the tire temperature and proactively intervenes to warn a driver before a temperature related failure occurs, and optionally reduce tire temperatures to reduce or prevent tire damage due to temperature related failure.

SUMMARY

In one aspect, there is disclosed a system to monitor tire temperature and provide a warning signal. In one embodiment, the system may include a temperature sensor assembly in sensing proximity to a tire. The assembly includes a sensor in electronic communication with a processor having a memory, and data in the processor memory corresponding to temperature points related to tire functioning. The system may further include a warning system to provide an alert signal when a predetermined tire temperature range is at least reached. The warning signal may be haptic, audio or visual, and may vary in intensity or frequency related to the operational temperature of the tire. The system may be placed in close proximity to the tire, such as, for example, at the tire stem, tire rim, tire inner wall, bolts on the tire rim or cover of the tire.

There is also disclosed a method to monitor a tire temperature with a sensor in electronic communication with a processor having temperature data values stored in memory comprising determining the operational tire temperature, determining whether the operational tire temperature exceeds a predetermined tire temperature range for a predetermined period of time, and providing an alert signal to indicate the tire operational temperature exceeds the predetermined tire temperature. The alert may be haptic, audio or visual, and may vary in intensity or frequency related to the operational temperature of the tire.

There is also disclosed a computer readable medium with instructions to cause a processor to execute the steps of determining tire temperature with data signals from a sensor in communication with a processor indicative of tire operational temperature. The processor has temperature data values stored in memory. The steps include determining whether the tire operational temperature exceeds a predetermined tire temperature range for a predetermined period of time; providing an alert signal to indicate the tire operation temperature exceeds a predetermined tire temperature in said range and providing an alert when said operational tire temperature exceeds the predetermined tire temperature range. The alert may be haptic, audio or visual, and may vary in intensity or frequency related to the operational tire temperature. The computer readable medium may further include instructions to provide coolant to the tire to reduce the operational tire temperature to a predetermined tire temperature.

BRIEF DESCRIPTION OF THE DRAWINGS

FIG. 1 is a perspective view of one embodiment of the system;

FIG. 2 is a perspective view of one embodiment of the system showing the valve stem cap configuration 10;

FIG. 3 is a detailed perspective view of the valve stem cap configuration 10;

FIG. 4 is a sectional view of one embodiment of the system taken along line 4-4 in FIG. 3;

FIG. 5 is a perspective view of one embodiment of the system showing the temperature sensor in the valve stem configuration 12.

FIG. 6 is a detailed perspective view of the temperature sensor in the valve stem configuration 12;

FIG. 7 is a sectional view of one embodiment of the system taken along line 7-7 in FIG. 6;

FIG. 8 is a perspective view of one embodiment of the system showing the lug nut cap configuration 14;

FIG. 9 is a detailed perspective view of the lug nut cap configuration 14;

FIG. 10 is a sectional view of one embodiment of the system taken along line 10-10 in FIG. 9;

FIG. 11 is a perspective view of one embodiment of the system showing the color changing adhesive sticker configuration 16;

FIG. 12 is a perspective view of one embodiment of the system showing the inner wheel mounted configuration 18;

FIG. 13 is a sectional view of one embodiment of the system taken along line 13-13 in FIG. 12;

DETAILED DESCRIPTION

Figure 14:
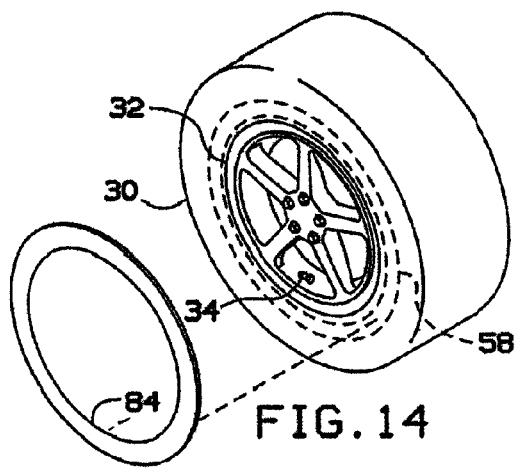
FIG. 14 is a perspective view of one embodiment of the system showing the inner wheel mounted configuration 18.

Turning now to the drawings wherein like numbers refer to like structures, and particularly to FIG. 1, there is shown a partial view of a vehicle interior showing an operator 28, a dashboard 26 and a warning indicator 24 mounted on the dash.

In one embodiment as seen in FIG. 2, the tire 10 has a tread portion 30 and a rim portion 32, which is separated from the tread portion by a sidewall extending unbroken therebetween as is conventional in the art. The tire is mounted on rim 32, and is equipped with a valve stem 34. The tire temperature sensor system may be mounted on the valve stem in a housing 36, which may be better appreciated by reference to FIG. 3.

FIG. 4 is a cutaway view of the valve stem of FIG. 3 taken along line 4-4. Sensor 38 is within housing 36 and has a portion 40 that interacts with valve stem 42. Note that the valve stem is depressed, so that the sensor may sense the air pressure within the tire. The housing 36 is threadably connected to the valve stem and provides an air tight closure at plate 44 in the housing. In this configuration, the sensor can sense changes in tire pressure related to temperature and transmit data to the processor indicative of tire operational temperature.

FIG. 5 is another embodiment of the system disclosed in this application. Tire 12 has the tread portion and rim portion and valve stem as described in connection to FIG. 2. However, as seen at FIG. 6, the valve stem and sensor are in an alternative embodiment. As seen in FIG. 7, which is taken along line 7-7 of FIG. 6, the valve stem is threadably fitted with a cap 46, as is conventional with tires. The stem has a valve stem as is known in the art. But in this embodiment, the sensor assembly 40 is positioned in the valve stem, where it may sense pressure changes in the tire indicative of temperature changes and transmits that data to the processor as previously described. Note that in this embodiment, the sensor may also directly sense tire operational temperature instead of pressure, and transmit that data to the processor.

FIGS. 8-10 depict another embodiment of the system of this disclosure showing a tire 14 mounted on a rim and having fasteners 50 to affix the rim to the hub 54 of the vehicle. In this embodiment one of the fasteners may be the sensor assembly in housing 48.

Turing now to FIG. 10, which is the sensor assembly 48 of FIG. 9 taken along line 10-10. Sensor assembly 38 is enclosed in housing 48, which may be affixed to a fastener 50, and provides access for the portion 40 to contact the fastener 50. The sensor, through its contact with the fastener 50, is in contact with lug 52 and any sense the operational temperature of the tire because, at least in part, tire temperature is transmitted throughout the rim, and the temperature is conducted from the rim through the lugs and fasteners to the sensor.

FIG. 11 shows a tire configuration 16 having a sidewall portion 56 in a section 58 of the tire where the system may be mounted. Sidewall portion 56 is shown in FIG. 11 as a partial circumferential adhesive sticker with an infrared indicator. In this embodiment, the system may cause the a color change in the tire when the tire operational temperature exceeds a predetermined temperature for a predetermined period of time.

FIGS. 12 and 13 show another embodiment of the system. Specifically, sensor assembly 60 may be mounted on the rim 18, as shown in FIG. 12. By reference to FIG. 13, taken along line 13-13 of FIG. 12, the interior 64 of the rim may have sensor assembly housing 60 mounted in close proximity to rim 32 periphery on inner surface 66 with adhesive 62. Sensor 38 is mounted within the housing. As with the other embodiment's temperature or pressure may be sensed and used by the processor to determine the operational temperature of the tire.

FIG. 14 shows another embodiment of the system where the sensor assembly is incorporated with the rim cover 84, and transmits data signal, perhaps over the ECAN or CAN to a processor to determine the operational tire temperature.

Figure 15:
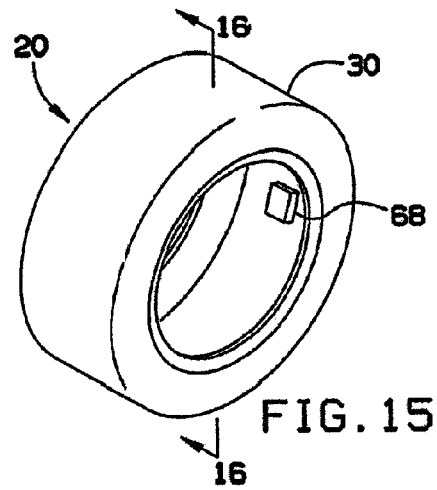
FIG. 15 is a perspective view of one embodiment of the system showing the inner tire mounted configuration 20.
Figure 16:
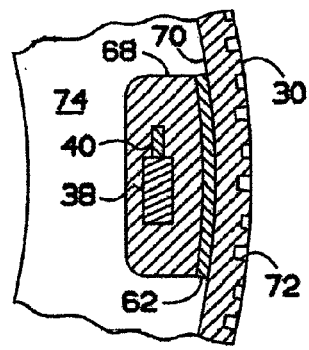
FIG. 16 is a section view of one embodiment of the system taken along line 16-16 in FIG. 15.

FIGS. 15 and 16 show another embodiment of the system. Specifically tire 20 has a sensor housing unit 68 mounted in the interior 74 of the tire. The sensor housing is secured on an adhesive 62 to the interior tread portion 70 and has the sensor 38 with portion 40 in the housing to sense either temperature directly or pressure of the tire from which temperature may be derived as is known in the art.

Figure 19:
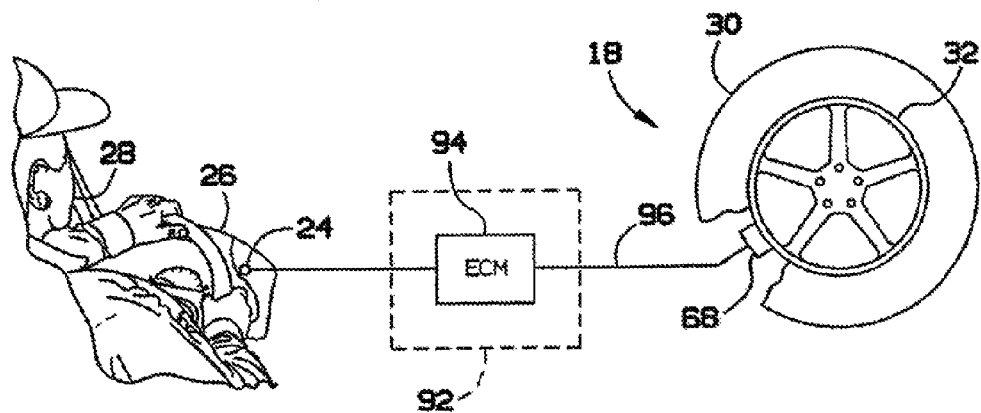
FIG. 19 is a system schematic of one embodiment of the system showing the inner wheel mounted configuration 18.
Figure 20:
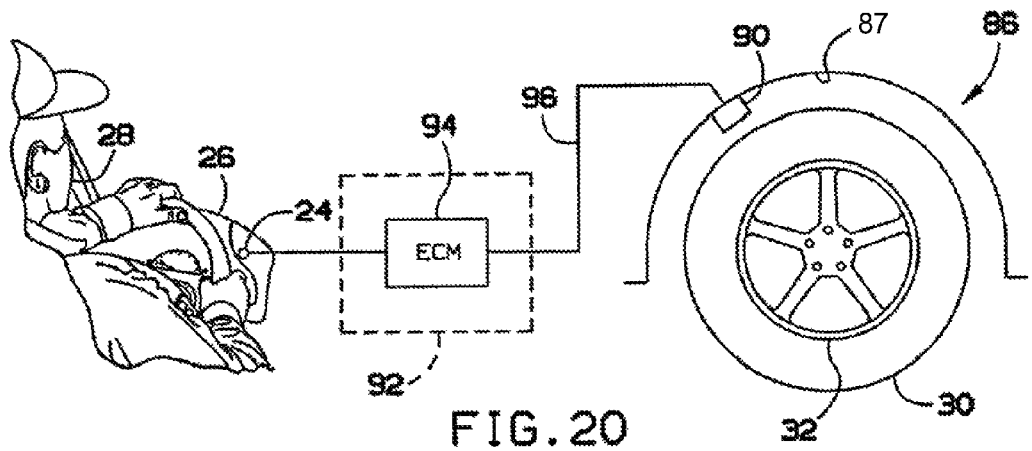
FIG. 20 is a schematic of one embodiment of the system showing the wheel well mounted configuration 86.

FIG. 19 shows a system 18 comprising a tire 30 mounted on a rim 32, as is known in the art. The tire is constructed as is conventional, with a tread portion, a side wall portion and the rim portion to define an inner portion and an outer portion. In the embodiment of FIG. 19, the sensor assembly 68 is mounted on the rim in the interior tire portion, and is electronically connected at 96 to the processor 94, which may be an electronic control unit, on an engine 92. In FIG. 20, the sensor assembly 90 is mounted in sensing proximity to the tire, showing it can be mounted on the wheel wall 88 of the fender 86. In each embodiment, the processor has memory with temperature data values stored therein and instructions for monitoring the operational tire temperature in manner to be hereinafter described. The processor is electronically connected to a warning device 24, in this example a visual alert signal mounted on a dash 26 in a vehicle to permit an operator 28 to observe the alert signal when the operational tire temperature exceeds a predetermined temperature range for a predetermined period of time. The alert signal, may be visual, audio or haptic, and may vary in intensity and/or frequency corresponding to the operational temperature of the tire.

Figure 17:
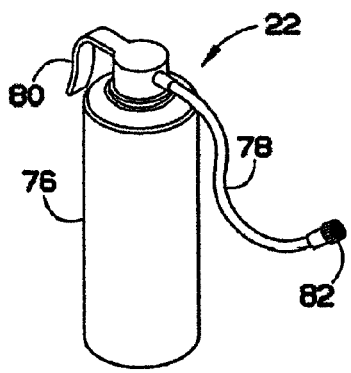
FIG. 17 is a perspective view of one embodiment of the system showing the liquid nitrogen and cooling powder dispensing system 22.

Turning to FIG. 17, there is shown a coolant system 22 to apply coolant to the tire when the operational tire temperature exceeds a predetermined temperature range for a predetermined period of time. In this embodiment, the coolant system 22 is shown as a receptacle 76 with an applicator conduit 78 and an outlet 82. The coolant, which may be any coolant including, but not limited to liquid nitrogen and cooling powder, may be released from the receptacle and applied to the tire by activation of the applicator mechanism 80, shown as a conventional trigger mechanism. The conventional trigger mechanism is activated by a signal from the processor and releases coolant from the receptacle through the conduit and outlet to the tire sidewall to cool the tire when the tire operational temperature is above a predetermined temperature.

Figure 18:
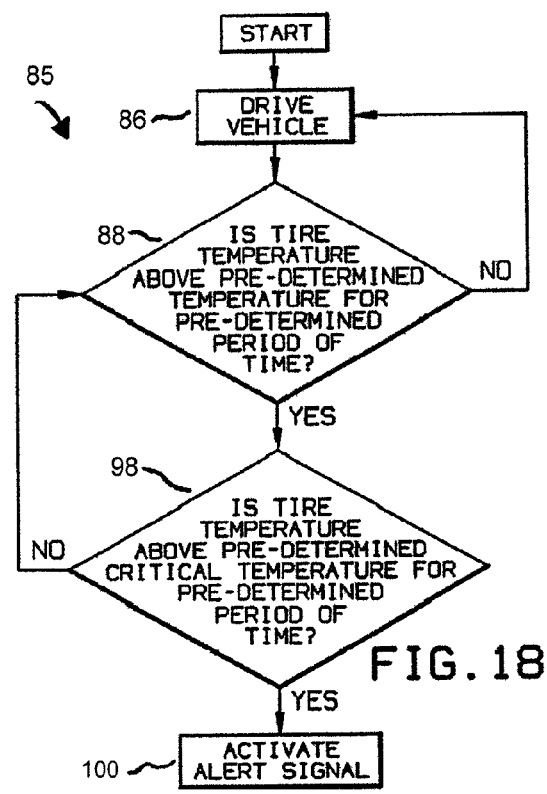
FIG. 18 is a flow chart of one embodiment of the method of the disclosure.

FIG. 18 shows one method 85 of the present disclosure. Step 86 is to operate the vehicle. Step 88, is determining whether the tire operational temperature is above a predetermined range for a predetermined period of time. One way to accomplish this step is to compare the actual tire temperature readings from the sensor against predetermined temperature values in stored memory in the processor, which may be an ECU. The values may be in tables or maps or any other computer readable medium. Step 98 is determining whether the operational tire temperature is above a predetermined critical temperature for a predetermined period of time. If yes, then an alert signal is sent as at step 100 warning the operator of the condition before tire failure occurs. If no, then the system loops back to step 88 and the process continues.

While the disclosure discusses the system in use with a vehicle tire, those skilled in the art appreciate that it may be used with any inflatable object where temperature in important to the functionality of the object.

The words used in this disclosure are words of description, and not words of limitation. Many variations and modifications are apparent to those skilled in the art and the description herein is not to be construed as limiting the scope of the invention as set forth in the appended claims.

What is claimed as new and desired to be protected by Letters Patent of the United States is:

1. A system to monitor tire temperature and provide a warning signal, comprising:
    a temperature sensing assembly located in sensing proximity to a tire; said assembly including a temperature sensor in electronic communication with a processor having memory, said processor having data stored in memory corresponding to temperature points related to tire functioning;

a warning system to provide an alert when a predetermined tire temperature range is at least reached; and a cooling system equipped with an outlet, said cooling system outlet in close proximity to said tire and controlled by said processor to cool said tire when said tire temperature is above a predetermined temperature.

2. The system of claim 1, wherein said warning system provides a visual, haptic or audio alert signal of varying intensity or frequency at predetermined temperatures within said temperature range.

3. The system of claim 1, wherein said temperature sensing assembly is at a tire stem, a tire rim, an inner wall of said tire, at a bolt of said tire rim, a cover over said tire rim, or incorporated directly into a tire material.

4. The system of claim 1, wherein said cooling system is a receptacle having a coolant stored therein.

5. The system of claim 4, wherein said coolant is at least one of liquid nitrogen and cooling powder.

6. The system of claim 1, wherein said processor is an electronic control unit.

7. A method to monitor tire temperature with a sensor in electronic communication with a processor having temperature data points stored in memory, comprising:

determining the operational temperature of a tire;

determining whether said operational temperature exceeds a predetermined tire temperature range for a predetermined period of time;

providing an alert signal to indicate the tire operational temperature exceeds a predetermined tire temperature in said range;

applying a coolant to said tire to reduce the operational temperature of said tire to a predetermined temperature.

8. The method of claim 7, wherein said alert signal is haptic, audio or visual.

9. The method of claim 7, wherein said alert signal is provided in a varying intensity or frequency.

10. The method of claim 8, wherein said predetermined tire temperature is below said predetermined temperature range.

11. The method of claim 7, wherein said processor is an electronic control unit.

12. A computer readable medium having stored thereon instructions which, when executed by a processor, cause the processor to execute the steps of determining tire temperature with data signals from a sensor in electronic communication with said processor indicative of tire operational temperature, said processor having temperature data points stored in memory;

determining whether said operational temperature exceeds a predetermined tire temperature range for a predetermined period of time;

providing an alert signal to indicate the tire operational temperature exceeds a predetermined tire temperature in said range and providing an alert when said operational temperature exceeds said predetermined tire range;

providing instructions to apply a coolant to a tire to reduce the tire operational temperature to a predetermined temperature.

13. The computer readable medium of claim 12, further including instructions to provide haptic, visual or audio alert signals.

14. The computer readable medium of claim 12, wherein said signal is varying intensity or frequency.

15. A system to monitor tire temperature and provide a warning signal, comprising:

a temperature sensing assembly located in sensing proximity to a tire;

said assembly including a temperature sensor and a warning system to provide an alert when a predetermined tire temperature range is at least reached; wherein the temperature sensor is a temperature sensitive chemical incorporated into at least a portion of said tire that changes color when the tire operational temperature exceeds a predetermined temperature for a predetermined period of time.

* * * * *